US012143297B2

(12) United States Patent
Shah (10) Patent No.: US 12,143,297 B2
(45) Date of Patent: *Nov. 12, 2024

(54) END-TO-END PATH DETECTION AND MANAGEMENT FOR INTER-BRANCH COMMUNICATION IN A WIDE AREA NETWORK (WAN)

(71) Applicant: Arista Networks, Inc., Santa Clara, CA (US)

(72) Inventor: Sandip K Shah, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,412

(22) Filed: Aug. 4, 2023

(65) Prior Publication Data

US 2023/0388225 A1 Nov. 30, 2023

Related U.S. Application Data

(63) Continuation of application No. 17/744,579, filed on May 13, 2022, now Pat. No. 11,757,769.

(51) Int. Cl.
| | |
|---|---|
| *H04L 45/00* | (2022.01) |
| *H04L 45/12* | (2022.01) |
| *H04L 45/121* | (2022.01) |
| *H04L 45/28* | (2022.01) |

(52) U.S. Cl.
CPC ............ *H04L 45/38* (2013.01); *H04L 45/121* (2013.01); *H04L 45/123* (2013.01); *H04L 45/28* (2013.01)

(58) Field of Classification Search
CPC ..... H04L 45/38; H04L 45/121; H04L 45/123; H04L 45/28
USPC ....................................................... 709/238
See application file for complete search history.

(56) References Cited

U.S. PATENT DOCUMENTS

| | | | |
|---|---|---|---|
| 2009/0006616 A1* | 1/2009 | Gore ..................... | H04L 67/131 710/316 |
| 2014/0317279 A1* | 10/2014 | Roper ..................... | H04L 45/70 709/224 |
| 2019/0014395 A1* | 1/2019 | Anand ..................... | H04L 45/38 |

* cited by examiner

*Primary Examiner* — Hermon Asres
(74) *Attorney, Agent, or Firm* — Tianyi He (57) ABSTRACT

A method of managing inter-branch communication is a network, including generating an end-to-end path, wherein the end-to-end path starts in a first computing device in a first branch and ends at a second computing device in a second branch, wherein the end-to-end path is generated using a plurality of flow records and a plurality of path records and the end-to-end path includes a wide area network (WAN) segment, and issuing, based on the generating, a notification to a network administrator, wherein the notification specifies the end-to-end path and a latency associated with at least one segment in the end-to-end path.

20 Claims, 7 Drawing Sheets

FIG. 4

END-TO-END PATH DETECTION AND MANAGEMENT FOR INTER-BRANCH COMMUNICATION IN A WIDE AREA NETWORK (WAN)

This application is a continuation of U.S. patent application Ser. No. 17/744,579, filed on May 13, 2022, which is hereby incorporated by reference herein in its entirety.

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Computing devices communicate with each other using networks. The computing devices may be grouped into branches, where each branch includes its own network (also referred to as a branch network). The branches may also include Wide Area Network (WAN) network devices. The WAN network devices serve as the interface between the branch network and one or more WANs. The WANs correspond to networks (e.g., the Internet, a Multi-protocol Label Switching (MPLS) network, etc.) that enable inter-branch communication. The following is a non-limiting example of how two branches may communicate. Turning to the example, consider a scenario in which there are two branches (B1, B2). In B1, there is a laptop (L), a wireless access point (WAP), a network device (ND1), and a WAN device (W1). In B2, there is a server (S), a network device (ND2), and a WAN device (W2). In this example, the packets may flow from the laptop to the server as follows: L→AP→ND1→W1→[WAN]→W2→ND2→S.

Continuing with the discussion, inter-branch communication between computing devices is complex and, as such, prone to errors. The errors may be within the branches and/or within the WAN(s). One approach to determining whether there is an error in the inter-branch communication is to detect whether there is unexpected latency during the inter-branch communications. Conventional approaches enable network administrators to determine latency within the branches (or within branch networks); however, the conventional approaches are not able to determine end-to-end latency for inter-branch communication. Without the ability to determine the aforementioned end-to-end latency, the network administrators are unable to identify when or where the unexpected latency is occurring. For example, if L and S (from the prior example) are communicating, the network administrator is unable to determine the latency for the corresponding packet flow over the entire path: L→AP→ND1→W1→[WAN]→W2→ND2→S. More specifically, the network administrator is unable to determine all the segments in the path or the latency associated with each of the segments. As a result, the network administrators have to attempt to resolve errors related to inter-branch communication solely relying on information received from the branch. This approach is inefficient as the network administrators are attempting to resolve an issue without a complete understanding of the path of the packets involved in the inter-branch communication.

Embodiments of the technology enable the determination of end-to-end paths between computing devices residing in different branches. Further, embodiments of the technology enable the determination of latency of the packets at each of the segments of the path, including the latency in the WAN segment (i.e., the segment between the WAN network devices). For example, if the path is L→AP→ND1→W1→[WAN]→W2→ND2→S, then embodiments of the technology identify the following segments: L→AP; AP→ND1; ND1→W1; W1→[WAN]→W2; W2→ND2; and N2→S. In this example, W1→[WAN]→W2 is the WAN segment.

Continuing with the discussion of the technology, once the end-to-end path is determined, embodiments of the technology enable the latency of each of the segments to be determined. The determined latency may then be compared to a baseline latency to determine (on a per-segment basis or on a per end-to-end basis) whether the determined latency has deviated from the baseline latency outside an expected range (e.g., outside one standard deviation). The network administrator may then be notified of any such deviations, where the notification may specify, e.g., the end-to-end path, the segments of the end-to-end path, the segment(s) that have deviated from the baseline outside the expected range, the application associated with the packets, and the 5-tuple that defines the flow with which the packets are associated. The aforementioned information provides the network administrators a more detailed understanding of the path on which packets travel for inter-branch communication as well as which segment(s) may be the potential source of any error(s).

In order to determine the end-to-end path, a controller that is operatively connected to the branches collects: (i) flow records from each of the branches, and (ii) path records from the WAN network devices. The flow records include flows (e.g., identified using 5-tuples) in the branch and the path of the flows take within the branch (also referred to as a non-WAN path). The flows identified in the flow records may: (i) start at a computing device and end at a WAN device or (ii) start at a WAN device and end at a computing device. The path records specify: (i) the flows that exit the WAN device, to which service provider the packets associated with the flow were transmitted, and the application (or application type) associated with the flow; or (ii) the flows that are received by the WAN device, from which service provider the packets associated with the flow were received, and the application (or application type) associated with the flow.

Continuing with the discussion of the controller, the controller aggregates the flow records and the path records and then analyzes the collected information to determine an end-to-end path for one or more flows. Referring to the example above, the controller uses the flow records from B1 to determine the following B1 non-WAN path for flow A:

L→AP→ND1→W1 and uses the flow records from B2 to determine the following B2 non-WAN path for flow A: W2→ND2→S. The controller then analyzes the path records from W1 to determine that packets associated with flow A exited W1 at Time 1 (T1) and were transmitted onto an MPLS network. Once the controller determines that packets associated with flow A were transmitted to the MPLS network at T1, it will review the path records to determine when packets associated with flow A were received by W2 from the MPLS network. The result of this determination is an identification of the WAN segment, which specifies that packets associated with flow A were transmitted to the MPLS network at T1 and were received from the MPLS network by W2 at T2, wherein T2 is after T1. At this stage, the B1 non-WAN path for flow A, the B2 non-WAN path for flow A, and the WAN segment for flow A are combined to generate the end-to-end path for flow A. Once the end-to-end path for flow A is determined, the latency at each of the segments is determined. The latency for the WAN segment is determined using the time (e.g., T1) that packets for flow A were transmitted from W1 to the MPLS network and the time (e.g., T2) that packets for flow A were received by W2 from the MPLS network.

As discussed above, the latency associated with each of the segments in the end-to-end path may then be used to determine whether there are any errors (or other issues) with the transmission of packets on the end-to-end path.

Various embodiments of the disclosure are described below.

Figure 1A:
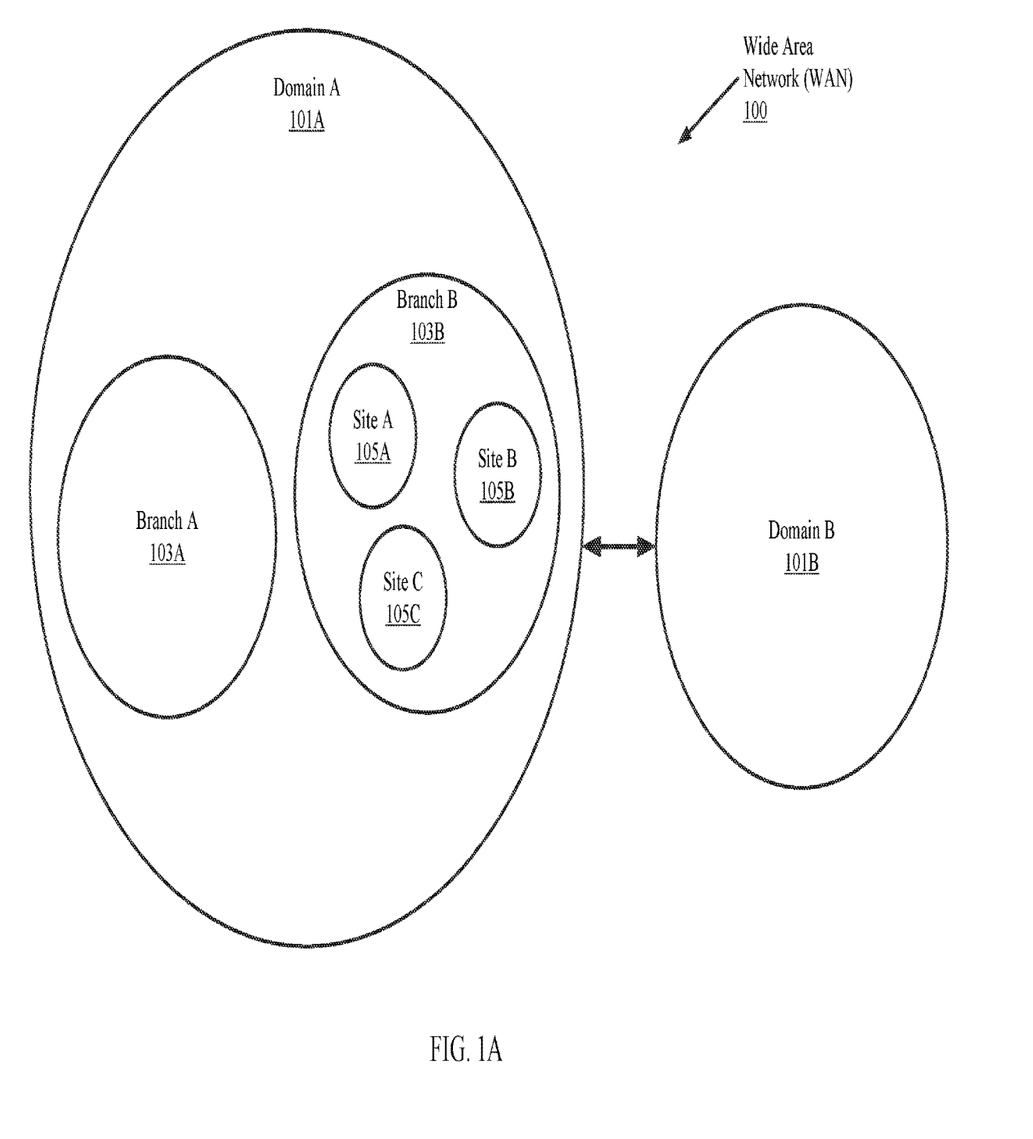
FIG. 1A shows an example of a wide area network (WAN) in accordance with one or more embodiments.

FIG. 1A shows an example wide area network (WAN) (100) in accordance with one or more embodiments disclosed herein. The WAN (100) may be a telecommunications network that extends over a large geographic area for implementing computer networking features. As shown in FIG. 1A, the WAN (100) may be divided (physically and/or logically) into a hierarchy including, but not limited to, domains (101A, 101B), branches (103A, 103B), and sites (105A-105C). As one example, each domain (101A, 101B) may cover a continent (e.g., North America, Europe, etc.), each branch (103A, 103B) may cover some or more states, cities, and/or provinces within the domain (101A, 101B), and each site may represent a physical location (and or virtual instance thereof) (e.g., a building such as an office, school, hospital, etc.) within a branch (103A, 103B).

Although the WAN (100) of FIG. 1A is shown as having only two domains (101A, 101B), two branches (103A, 103B), and three sites (105A, 105C), one of ordinary skill in the art would appreciate that the WAN (100) may have any number of each of these components without departing from the scope of one or more embodiments herein. Additionally, different terms and/or examples may be used to describe each hierarchical level of the WAN (100) without departing from the scope of one or more embodiments. For example, a domain may cover a portion of (e.g., half) of a continent rather than a full area of the continent.

In one or more embodiments, each domain (101A, 101B), branch (103A, 103B), and site (105A-105C) of the WAN (100) may include network devices (discussed in more detail below in FIG. 1B) that are able to communicate (e.g., transfer information in the form of network traffic such as data packets) with one another using one or more service providers (e.g., 119A, 119N). As an example, each site (105A-105C) may include one or more branch network devices (e.g., 111A, 111N, FIG. 1B). Each branch (103A, 103B) may include at least one WAN network device (e.g., 113A-113N, FIG. 1B) as a relay point for the branch network devices of that branch to communicate with network devices in other branches (including branches of other domains). The WAN network devices may also be located at one of the sites (105A-105C) along with one or more of the branch network devices. Additionally, each domain (101A, 101B) may have a controller (e.g., 115, FIG. 1B) in charge of controlling and/or monitoring the network devices within that domain.

Figure 1B:
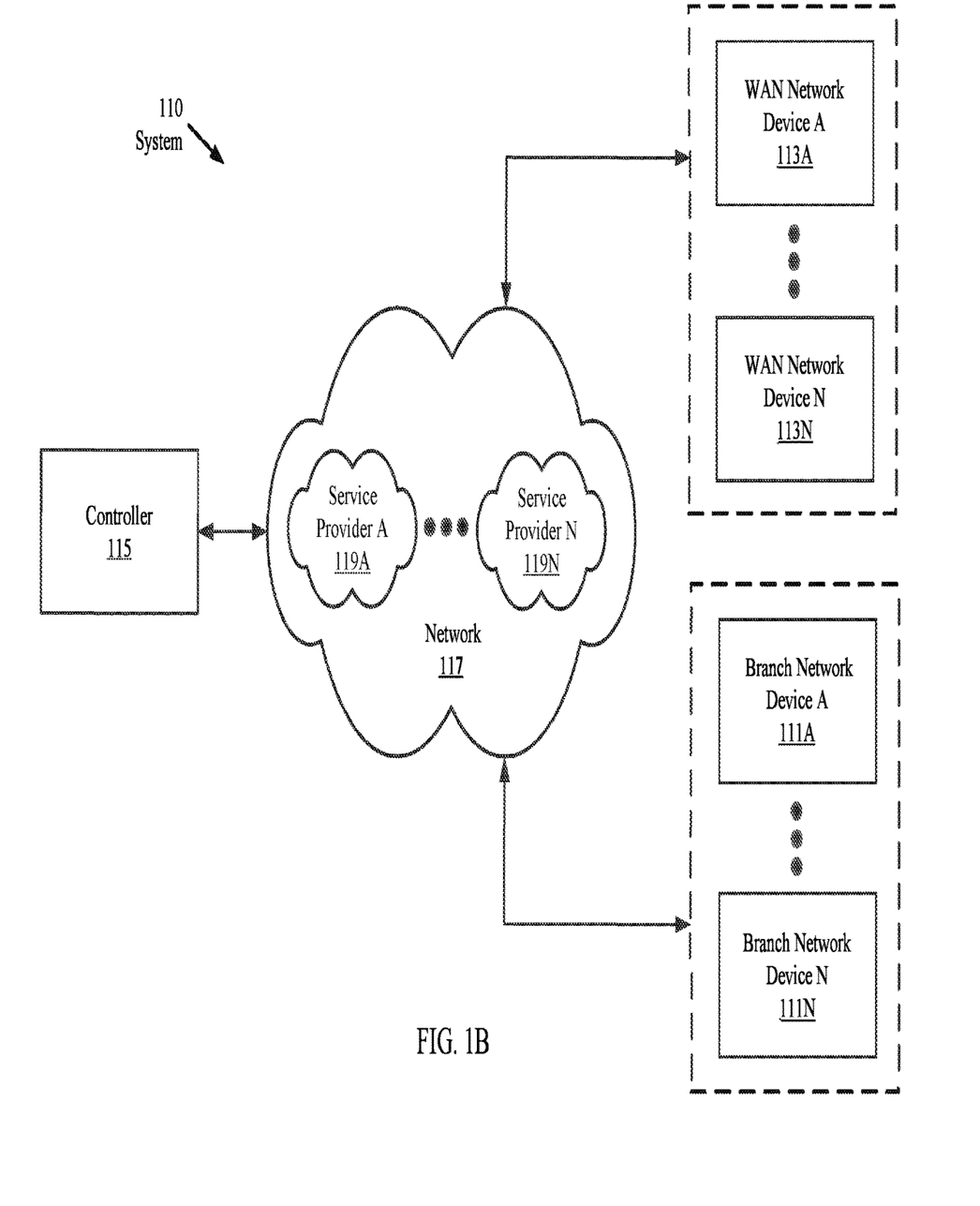
FIG. 1B shows a system in accordance with one or more embodiments described herein.

FIG. 1B shows a system (110) in accordance with one or more embodiments of the disclosure. As discussed above, the system (110) may include components that are physically located within each hierarchical level of the WAN (100). In particular, the system (110) includes one or more branch network devices (111A, 111N), one or more WAN network devices (113A, 113N), and a controller (115) that are connected through a network (117) composed of one or more service providers (119A, 119N). Each of these components is described below.

In one or more embodiments disclosed herein, the one or more branch network device(s) (111A, 111N) are physical devices that include persistent storage, memory (e.g., random access memory), one or more processor(s) (such as a switch chip), and two or more physical ports. Examples of the branch network devices (111A, 111N) include, but are not limited to, a router, a switch, a top of rack (TOR) switch, and a multilayer switch that are connected to one or more computing devices (not shown) (e.g., computers, laptops, smartphones, tablets, etc.). As discussed above, in the context of the WAN (100) in FIG. 1A, each site (105A-105C) of the WAN (100) may include one or more of the branch network devices (111A, 111N). The branch network devices (111A, 111N) are not limited to the aforementioned specific examples.

The switch chip is hardware that determines which egress port on a branch network device (111A, 111N) to forward packets (which may be in the form of media access control (MAC) frames). The switch chip may include egress and ingress ports that may connect to ports on the branch network device (111A, 111N). Each port may or may not be connected to another device (e.g., a server, a switch, a router, etc.). The branch network device (111A, 111N) may be configured to receive the packets via the ports.

Additionally, the persistent storage in the branch network devices (111A, 111N) may include any type of non-transitory computer readable medium that stores data. For example, the data in the persistent storage may be instructions, which, when executed by one or more processor(s) in the branch network device (111A, 111N), enable the branch network device (111A, 111N) to perform one or more functions of the branch network device (111A, 111N).

The branch network devices (111A, 111N) may further include functionality to sample packets that it receives and/or transmits in order to generate flow records (described below in FIG. 2).

In one or more embodiments disclosed herein, similar to the branch network devices (111A, 111N), the one or more WAN network devices (113A, 113N) are physical devices that include persistent storage, memory (e.g., random access memory), one or more processor(s), and two or more physical ports. Examples of the WAN network devices (113A, 113N) include, but are not limited to, a WAN router that connects and manages one or more branch network devices (111A, 111N). For example, a WAN network device (113A, 113N) may be configured as a network device that broadcasts data to every branch network device (111A, 111N) that is connected to the WAN network device (113A, 113N). As discussed above, in the context of the WAN (100) in FIG. 1A, each branch (103A, 103B) may include at least one WAN network device (113A, 113N) that is connected to each of the branch network devices (111A, 111N) at the sites (105A-105C) within the branch (103A, 103B). For example, for Branch B (103B) with multiple sites (105A-105C), the WAN network device (113A, 113N) may be located at one of the sites (105A-105C) within branch B (103B). At least one WAN network device (113A, 113N) is configured as the point of communication for that branch with network devices disposed in other branches of the enterprise network. The WAN network devices (113A, 113N) are not limited to the aforementioned specific examples.

The WAN network devices (113A, 113N) may further include functionality to perform deep packet inspection (DPI) using any known or later discovered technique or mechanism in order to determine: (i) the application that issued the packet or (ii) the type of application that issued the packet. For example, DPI may be used to determine that a packet was issued by Video Stream Service Application A or that the packet was issued by a video streaming application (but not identify the specific video streaming application).

The WAN network devices (113A, 113N) may further include functionality to collect sufficient information about packets that it receives and transmits in order to generate path records (described below in FIG. 2).

Figure 2:
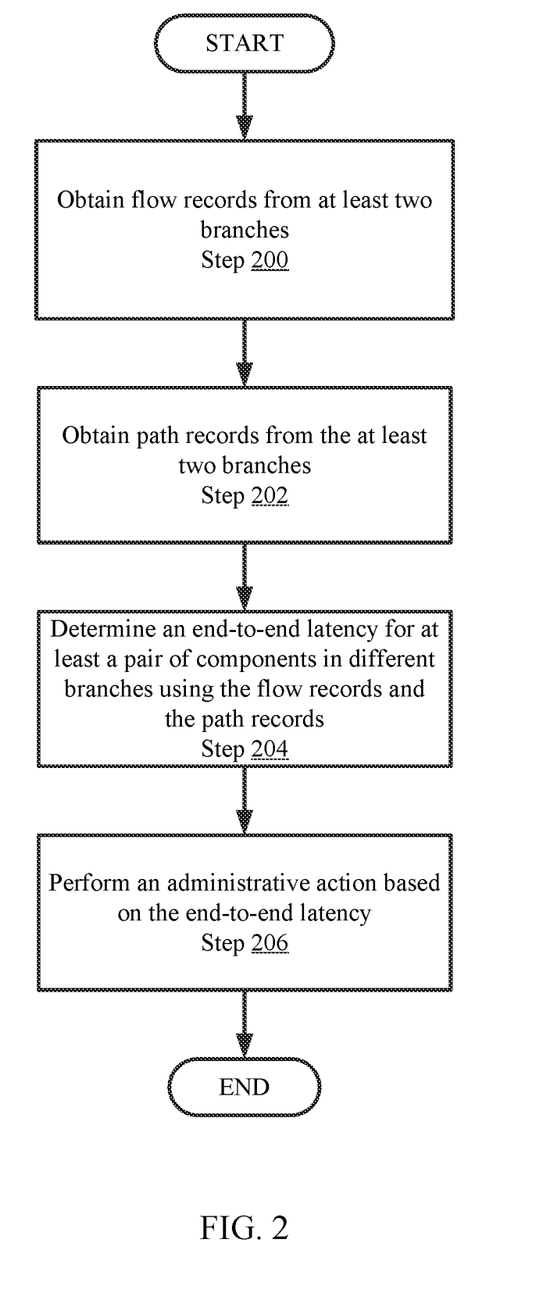
FIG. 2 shows a flowchart in accordance with one or more embodiments described herein.

In one or more embodiments disclosed herein, the controller (115) is a physical or virtual device that may be used for performing various embodiments of the disclosure (see e.g., FIG. 2). The physical device may correspond to any physical system (e.g., the computing device of FIG. 4) with functionality to implement the various embodiments of the disclosure. For example, the physical device may be a server (i.e., a device with at least one or more processor(s), memory, and an operating system) that is connected (e.g., directly connected or indirectly connected) via the network connected to the WAN network devices (113A, 113N) and the branch network devices (111A, 111N) (through the WAN network devices (113A, 113N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment disclosed herein, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

As discussed above, in the context of the WAN (100) in FIG. 1A, each domain (101A, 101B) may include a single controller (115). However, one or more embodiments disclosed herein is not limited to this configuration. For example, each domain (101A, 101B) may include multiple controllers (115) and each branch (103A, 103B) with multiple sites (105A-105C) may also include one or more controllers (115). In general, the WAN (100) may include any number of controllers (115) at any hierarchical level of the WAN (100) without departing from the scope of one or more embodiments disclosed herein as long as each controller (115) is configured to control and/or monitor a group of network devices (e.g., the WAN network devices (113A, 113N) and the branch network devices (111A, 111N)).

In one or more embodiments disclosed herein, the network (117) may be the medium through which the branch network devices (111A, 111N), the WAN network devices (113A, 113N), and the controller (115) are connected within the WAN (100). In one embodiment of the disclosure, the network may include other network devices (or systems) (not shown) that facilitate communication between the aforementioned components. As such, in one embodiment of the disclosure, the network may include any combination of local (e.g., local area network (LAN) and/or WAN segments that may be wire-based and/or wireless and that may use any combination of wired and/or wireless communication protocols.

In one or more embodiments disclosed herein, the network (117) is a WAN. The WAN is a set of interconnected (or peered) networks that are owned and/or operated by one or more service providers (SPs) (119A, 119N). The SPs provide the WAN network devices (113A, 113N), and the controller (115) links (also referred to as "access links") to access (or otherwise communicate with) the network (117). For example, the SPs (119A, 119N) may be private (e.g., multiprotocol label switching (MPLS) providers) or public (e.g., internet service providers (ISPs)) SPs. The SPs (119A, 119N) are not limited to the aforementioned specific examples and may also include other types of SPs such as, for example, telecommunication SPs.

Those skilled in the art will appreciate that the embodiments disclosed in the application are not limited to the hierarchy in FIG. 1A or the system architecture shown in FIG. 1B.

FIG. 2 shows a flowchart of a method in accordance with one or more embodiments of the disclosure. The method shown in FIG. 2 may be performed by, for example, the controller of the network. Other components of the systems in FIG. 1B may perform all, or a portion, of the method of FIG. 2 without departing from the scope of this disclosure.

While FIG. 2 is illustrated as a series of steps, any of the steps may be omitted, performed in a different order, additional steps may be included, and/or any or all of the steps may be performed in a parallel and/or partially overlapping manner without departing from the disclosure.

In Step 200, the controller obtains flow records from at least two branches involved in inter-branch communication (i.e., a computing device, a branch network device, or a WAN device in one of the branches is sending or receiving packets from a computing device, a branch network device, or a WAN device in another branch).

One or more branch network devices or WAN network devices may sample packets using, e.g., sFlow, post-card based telemetry, any other packet sampling mechanism, or any combination thereof. The sampled packets are then analyzed in order to generate one or more flow records. The flow records may specify a flow using a <5-tuple> (defined below) and include the key, a path header (including the number of path type-length-values) and a per-path TLV. The per-path TLV may be structured as follows: Type: Path, Length: Number of Hops, Value: Hops and Latency for each hop (min, max, average, and/or 95th percentile value for latency) within the measurement period. The flow record for a given flow may include more, less or different information without departing from the disclosure.

The <5-tuple> that is used to identify the flow may include the source IP address, the destination IP address, the source port, the destination port, and a layer 4 protocol identifier (e.g., TCP, UDP, and ICMP, etc.). The 5-tuple may be generated by analyzing the headers of the sampled packets.

The flow records may be received by the controller via an encrypted and/or encapsulated tunnel (e.g., a VXLAN tunnel), where the tunnel may start at a branch network device or the WAN network device and terminate at the controller.

The branch network devices or WAN network devices may continuously sample packets and then periodically send flow records to the controller. Additionally, or alternatively, the branch network devices or WAN network devices may only sample packets and generate and send flow records in response to a command or event, e.g., the branch network device or WAN network device receives a command from the controller (or from a computing device operated by a network administrator) to sample packets, the branch network device or WAN network device detects a change in its operation and automatically starts sampling packets, etc. The disclosure is not limited to the aforementioned examples.

In Step 202, the controller obtains path records from at least two branches involved in inter-branch communication.

In one or more embodiments, the WAN network devices monitor all packets sent and received by the WAN network device, perform analysis on the monitored packets, and then generate path records based on the analysis.

The path records may specify: (i) the flows (e.g., using the 5-tuple) that exit the WAN device, to which service provider the packets associated with the flow were transmitted, and the application (or application type) associated with the flow; or (ii) the flows (e.g., using the 5-tuple) that are received by the WAN device, from which service provider the packets associated with the flow were received, and the application (or application type) associated with the flow. The path record for a given flow(s) may include more, less or different information.

The service provider referenced in the path records corresponds to the service provider whose access links were used to access the WAN and whose access links were used to receive packets from the WAN.

The path records may be received by the controller via an encrypted and/or encapsulated tunnel (e.g., a VXLAN tunnel), where the tunnel may start at the WAN network device and terminate at the controller.

The WAN network devices may monitor packets and then periodically send path records to the controller. Additionally, or alternatively, the WAN network devices may only monitor packets and generate and send path records in response to a command or event, e.g., the WAN network device receives a command from the controller (or from a computing device operated by a network administrator) to generate path records, the WAN network device detects a change in its operation and automatically starts generating path records, etc. The disclosure is not limited to the aforementioned examples.

In Step 204, the end-to-end latency of packets being communicated between at least a pair of components (i.e., computing device and network devices) in different branches is determined using the flow records and the path records.

In one or more embodiments, the flow records obtained from the individual branches are used to determine the per-flow non-WAN path in each of the branches. The non-WAN path is the path a packet (which is associated with a flow) takes from: (i) a source component (i.e., a computing device and a network device) to the WAN device in the branch; or (ii) the WAN device in the branch to a target component in the branch (i.e., a computing device and a network device). A non-WAN path may be obtained by identifying all components that were traversed by packets associated with a given flow in the branch using the information related to paths in the flow records.

The path records are then used to "stitch together" the non-WAN paths associated with a given flow by identifying a WAN segment. The WAN segment is identified by: (i) determining when packets for the flow were transmitted from a WAN device in a branch and what service provider was used to transmit the packets onto the WAN, and (ii) determining when packets for the flow were received at a WAN device in a branch via the service provider identified in (i). The WAN segment that is identified is associated with the following information: (i) a time stamp (T1) of when a packet associated with the flow was transmitted to the WAN from a WAN device in a first branch and (ii) a time stamp (T2) of when a packet associated with the flow was received from the WAN by a WAN device in a second branch.

Once the WAN segment is identified, the WAN segment is combined by the corresponding non-WAN path associated with the flow to generate an end-to-end path.

The latency associated with each segment in the end-to-end path is then determined using the latency information in the flow records and a calculated latency from the path records. The calculated latency in the path records is determined using the timestamps associated with the WAN segment (e.g., T1 and T2), where the latency is determined by finding the difference between the time stamps (e.g., T2-T1).

Step 204 may be performed on a per-flow basis.

In Step 206, an administrative action(s) is performed based on the end-to-end latency. The administrative action may include one or more of the following actions. The disclosure is not limited to the aforementioned administrative actions.

Administrative Action 1—Store End-to-End Latency

The end-to-end path and end-to-end latency for a flow is stored in the controller (or in storage accessible to the controller). The end-to-end latency may be stored as a single value or may be stored as a series of latencies—one associated with each segment in the end-to-end path. The stored latency(ies) may then be used to establish a baseline latency(ies). The baseline latency(ies) may include a baseline end-to-end latency and/or a per-segment baseline latencies. The controller may also store the application (or application type) associated with the flow.

Administrative Action 2—Notification (No Error)

The controller may issue a notification (e.g., an email) to a network operator, where the notification specifies the end-to-end path and end-to-end latency for a flow or set of flows. The notification may also include any other information that was stored in Administrative Action 1.

Administrative Action 3—Notification (Error)

The controller may compare the end-to-end latency for a flow to a corresponding baseline latency and then determine that the end-to-end latency for the flow has deviated from the baseline latency outside an expected range (e.g., outside one standard deviation). Based on the determination, the controller may issue a notification (e.g., an email) to a network operator, where the notification specifies the end-to-end path and end-to-end latency for a flow or set of flows along with information about the deviation. The notification may also include information about the baseline end-to-end latency for a flow. The notification may also include any other information that was stored in Administrative Action 1.

In another embodiment, based on the determination, the controller may issue a notification (e.g., an email) to a network operator, where the notification specifies the end-to-end path and end-to-end latency for a flow or set of flows along with per-segment latency information. The notification may also include information that identifies the specific segment(s) that have latencies that are outside the expected range. The notification may also include any other information that was stored in Administrative Action 1.

Continuing with the discussion of FIG. 2, Step 206 may be performed on a per-flow basis or may be performed for a set of flows.

Figure 3A:
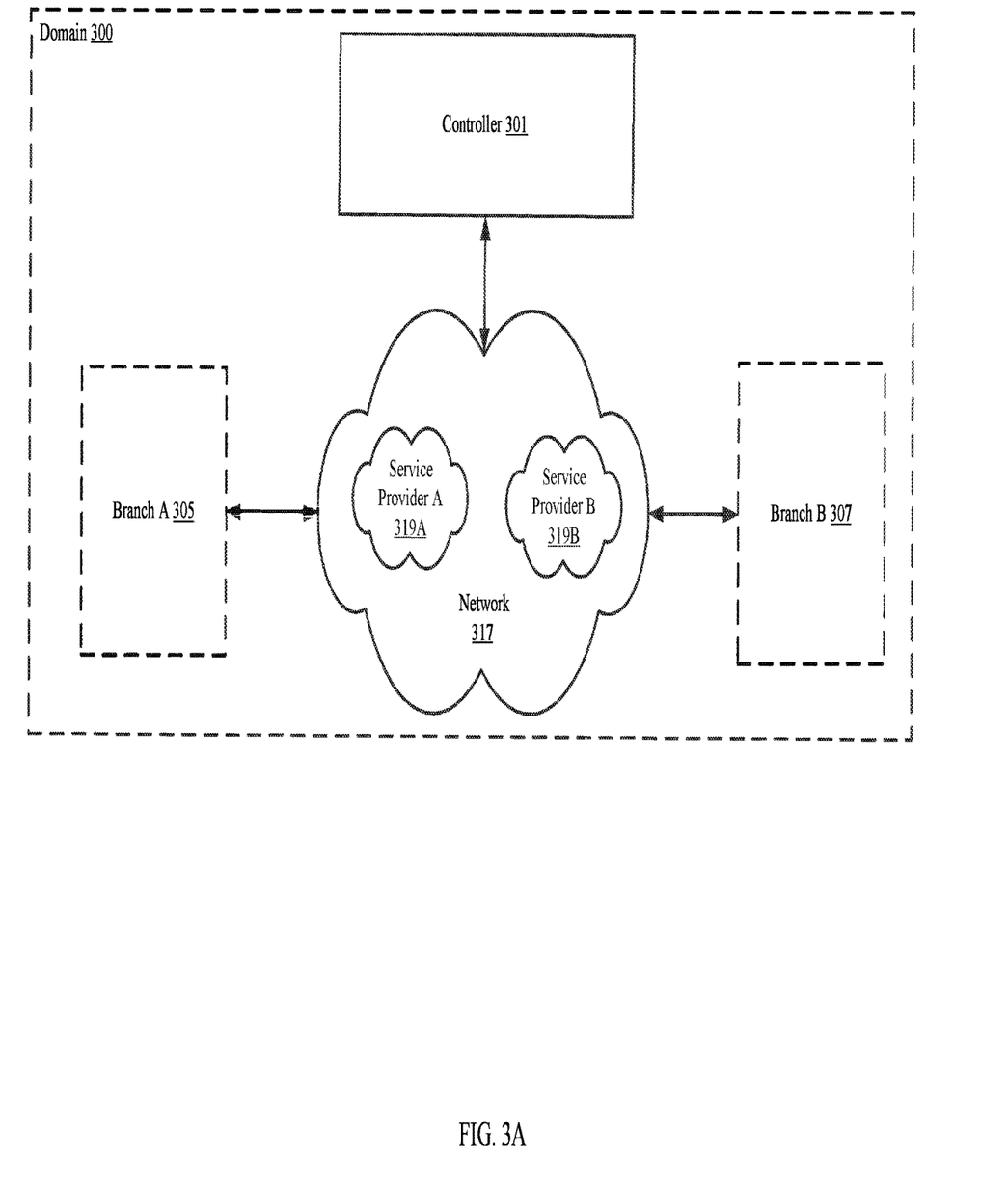
FIGS. 3A-3C show an example in accordance with one or more embodiments described herein.
Figure 3B:
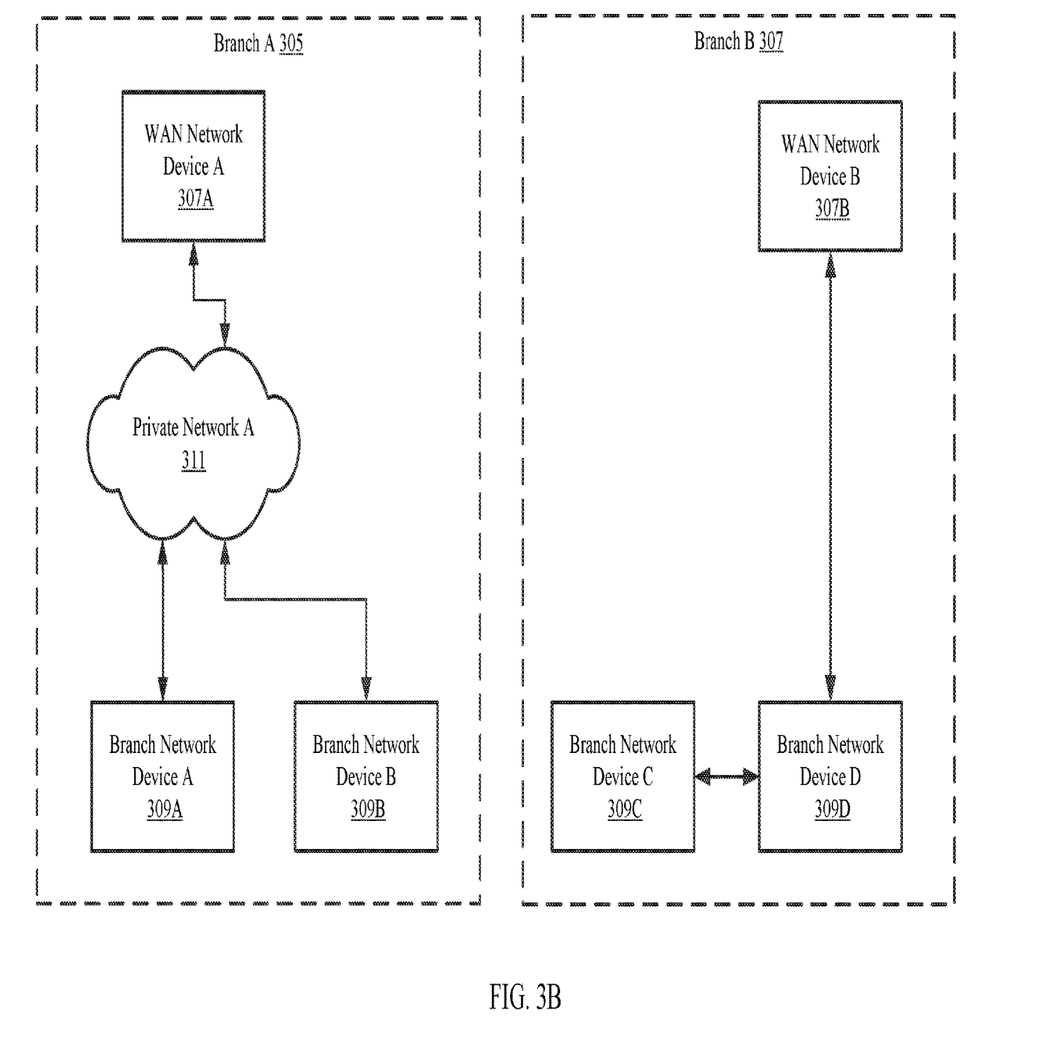
Figure 3C:
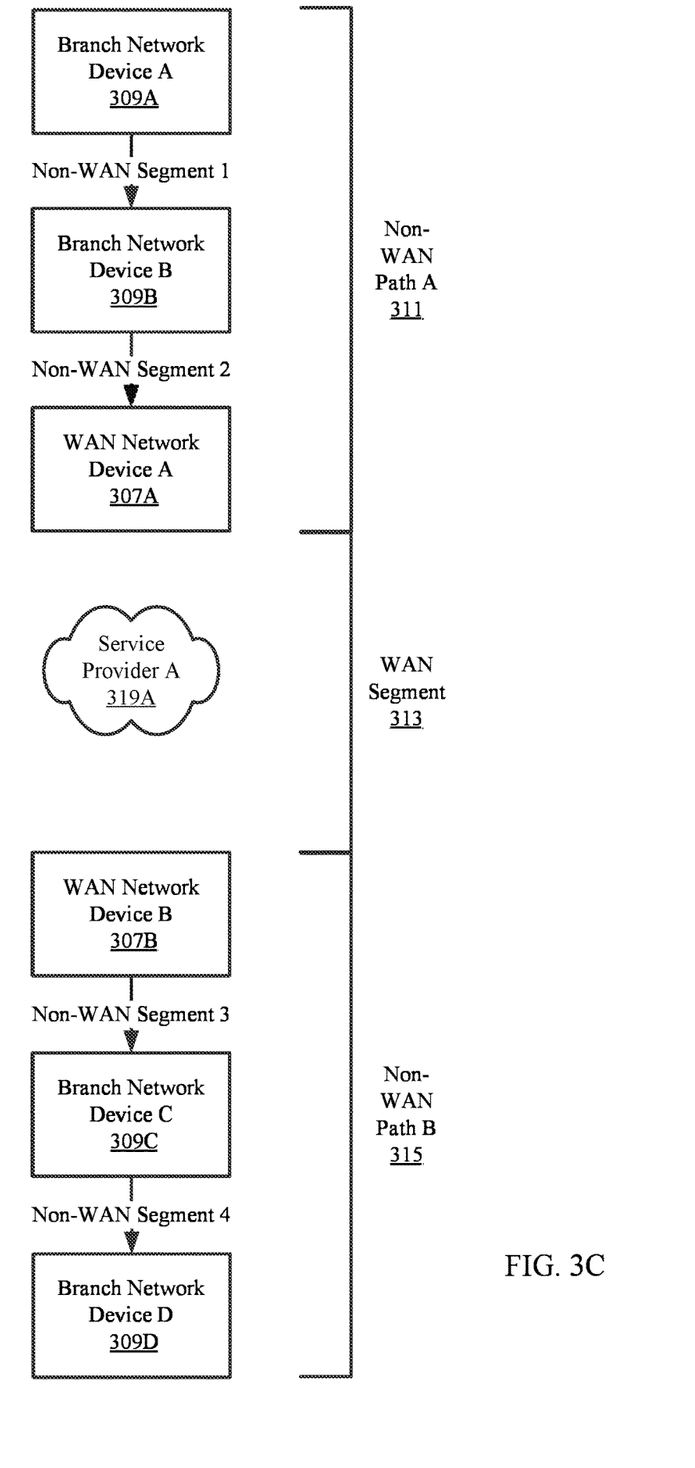

To further clarify embodiments of the disclosure, another example is provided in FIGS. 3A-3C.

Example

Turning to FIG. 3A, consider a scenario in which there are two branches (Branch A (305) and Branch B (307)) and a controller (301) that are connected via a network (317). The network (317) is accessible via two service providers (service provider A (319A) and service provider B (319B)). Referring to FIG. 3B, Branch A (305) includes Branch Network Device A (309A), Branch Network Device B (309B), and WAN network device A (307A) all of which are connected via a private network (311) (i.e., a network that is only within Branch A (305)). Branch B (307) includes Branch Network Device C (309C), Branch Network Device D (309D), and WAN network device A (307B).

Referring to FIG. 3C, in this example Branch Network Device A (309A) is sending packets to Branch Network Device D (309D). Branch Network Device A (309A), Branch Network Device B (309B), and WAN network device A (307A) all sample packets that are being transmitted from Branch Network Device A (309A) towards Branch Network Device D (309D). The sampled packets are then used to generate a set of flow records (referred to as Branch A flow records). Similarly, Branch Network Device C (309C), Branch Network Device D (309D), and WAN network device B (307B) all sample packets that are being transmitted from Branch Network Device A (309A) towards Branch Network Device D (309D). The sampled packets are then used to generate a set of flow records (referred to as Branch B flow records).

Further, WAN network device A (307A) is monitoring packets that are being transmitted from Branch Network Device A (309A) towards Branch Network Device D (309D) via service provider A (319A). The monitored packets are used to generate path records (referred to as Branch A path records). Similarly, WAN network device B (307B) is monitoring packets that are being transmitted from Branch Network Device A (309A) towards Branch Network Device D (309D) via service provider A (319A). The monitored packets are used to generate path records (referred to as Branch B path records).

The aforementioned flow records and path records are obtained by the controller (301). The controller, in accordance with the method shown in FIG. 2, uses the Branch A flow records to generate the non-WAN path A (311) and uses the Branch B flow records to generate the non-WAN path B (315). Finally, the controller uses the Branch A path records and the Branch B path records to identify a WAN segment (313) that "connects" non-WAN path A (311) and non-WAN path B (315). The result is an end-to-end path that includes non-WAN segments 1-4 and the WAN segment (313).

Once the end-to-end path is determined, the end-to-end latency associated with the end-to end-path is generated and one or more administrative actions are performed.

End of Example

Figure 4:
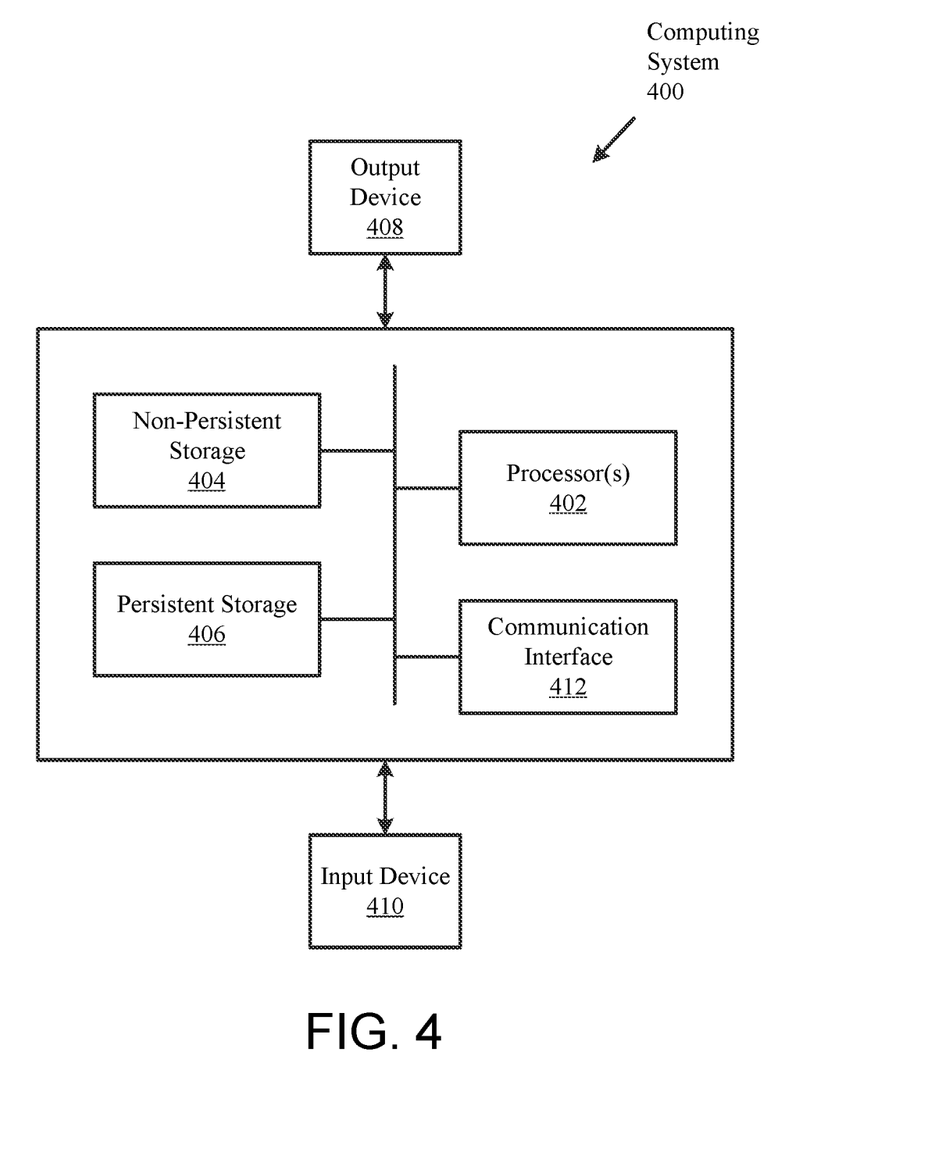
FIG. 4 shows a diagram of a computing device in accordance with one or more embodiments described herein.

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term connected, or connection, means that there exists between elements/components/devices a direct or indirect connection that allows the elements to interact with one another in some way. For example, the term 'connected' may refer to any direct (e.g., wired and/or wireless directly between two devices or components) or indirect (e.g., wired and/or wireless connections between any number of devices or components connecting the connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of operating a controller, the method comprising:
    obtaining, by the controller, a first set of flow records based on a sampling of network traffic in a first branch;
    obtaining, by the controller, a second set of flow records based on a sampling of network traffic in a second branch;
    obtaining, by the controller, a set of path records for network traffic traversing between the first branch and the second branch over a wide area network (WAN);
    determining, by the controller, an end-to-end path between a first computing device in the first branch and a second computing device in the second branch based on the first set of flow records, the second set of flow records, and the set of path records; and
    taking an action based on the end-to-end path.

2. The method of claim 1, wherein obtaining the set of path records comprises:
    obtaining, by the controller, first path records associated with network traffic exiting the first branch; and
    obtaining, by the controller, second path records associated with network traffic entering the second branch.

3. The method of claim 1, wherein the end-to-end path comprises a first path segment in the first branch, a second path segment in the second branch, and a third path segment between the first and second branches.

4. The method of claim 3, wherein determining the end-to-end path comprises:
    determining the first path segment based on the first set of flow records;
    determining the second path segment based on the second set of flow records; and
    determining the third path segment based on the set of path records.

5. The method of claim 4, wherein the WAN comprises one or more service provider networks and wherein the third path segment traverses the one or more service provider networks.

6. The method of claim 1, wherein determining the end-to-end path comprises determining, by the controller, a latency associated with the end-to-end path and wherein taking the action is based on the latency associated with the end-to-end path.

7. The method of claim 6, wherein the latency is an end-to-end latency of the end-to-end path.

8. The method of claim 7, wherein taking the action comprises issuing, by the controller, a notification responsive to the end-to-end latency deviating from a baseline end-to-end latency.

9. The method of claim 6, wherein the latency is a segment latency of a segment of the end-to-end path and wherein taking the action comprises issuing, by the controller, a notification responsive to the segment latency deviating from a baseline segment latency.

10. A controller comprising:
    one or more processors; and
    storage comprising instructions, which when executed by the one or more processors, cause the one or more processors to:
        receive a first set of flow records indicative of a path in a first branch taken by a network flow;
        receive a second set of flow records indicative of a path in a second branch taken by the network flow;
        receive a set of path records indicative of a path between the first branch and the second branch taken by the network flow over a wide area network (WAN);
        obtain a latency associated with an end-to-end path that includes the path in the first branch, the path between the first branch and the second branch, and the path in the second branch; and
        issue a notification based on the latency associated with the end-to-end path.

11. The controller of claim 10, wherein the latency is an end-to-end latency of the end-to-end path and wherein the notification comprises an indication that the end-to-end latency is deviating from a baseline end-to-end latency.

12. The controller of claim 10, wherein the latency is a segment latency of a segment of the end-to-end path, wherein the notification comprises an indication that the segment latency is deviating from a baseline segment latency, and wherein the segment of the end-to-end path is the path in the first branch, the path between the first branch and the second branch, or the path in the second branch.

13. The controller of claim 10, wherein the one or more processors and the storage are implemented on a server.

14. A method of managing a network flow traversing a wide area network (WAN), the method comprising:
    determining a first path segment in a first branch traversed by the network flow based on first flow records for the first branch;

determining a second path segment in a second branch traversed by the network flow based on second flow records for the second branch;

determining a third path segment between the first branch and the second branch traversed by the network flow based on path records of network traffic exiting the first branch and entering the second branch, wherein the first, second, and third path segments form an end-to-end path for the network flow;

establishing a baseline value for a metric associated with the end-to-end path based on at least one of the first flow records, the second flow records, or the path records; and taking an action in response to a deviation of the metric from the baseline value.

15. The method of claim 14, wherein taking the action comprises issuing a notification indicating the network flow and information associated with the deviation.

16. The method of claim 14, wherein each packet in the network flow has a same source Internet Protocol (IP) address, a same destination IP address, a same source port, a same destination port, and a same layer 4 protocol identifier.

17. The method of claim 14 further comprising:

obtaining the first flow records, the first flow records being generated using at least a first network device in the first branch;

obtaining the second flow records, the second flow records being generated using at least a second network device in the second branch; and obtaining the path records, the path records being generated using at least a third network device in the first branch or in the second branch.

18. The method of claim 14, wherein the metric is latency.

19. The method of claim 1, wherein flow records in the first and second sets of flow records and path records in the set of path records each identity a corresponding flow using at least a source Internet Protocol (IP) address, a destination IP address, a source port, and a destination port.

20. The controller of claim 10, wherein the first set of flow records is generated based on sampling traffic in the network flow at one or more network devices along the path in the first branch and wherein the second set of flow records is generated based on sampling traffic in the network flow at one or more network devices along the path in the second branch.

* * * * *